United States Patent
Hong et al.

(10) Patent No.: US 7,079,404 B2
(45) Date of Patent: Jul. 18, 2006

(54) SWITCHING MODE POWER SUPPLY FOR LOW POWER OPERATION

(75) Inventors: Jong-Woon Hong, Busan (KR); Dong-Young Huh, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 75 days.

(21) Appl. No.: 10/672,997

(22) Filed: Sep. 26, 2003

(65) Prior Publication Data

US 2004/0076022 A1 Apr. 22, 2004

(30) Foreign Application Priority Data

Oct. 21, 2002 (KR) .................. 10-2002-0064188

(51) Int. Cl.
*H02M 3/335* (2006.01)
(52) U.S. Cl. .................. 363/21.01; 363/97
(58) Field of Classification Search .......... 363/21.1, 363/21.16, 97, 95, 16, 20, 21.17; 323/222, 323/282, 283–286
See application file for complete search history.

(56) References Cited

U.S. PATENT DOCUMENTS

| 6,252,783 B1 * | 6/2001 | Huh et al. ............... 363/21.01 |
| 6,646,894 B1 * | 11/2003 | Hong et al. ............. 363/21.01 |

* cited by examiner

*Primary Examiner*—Rajnikant B. Patent
(74) *Attorney, Agent, or Firm*—Kenneth E. Horton; Kirton & McConkie

(57) ABSTRACT

A switching mode power supply is described. The switching mode power supply includes a power supply unit, a mode setting unit, a feedback circuit, and a switching controller. The switching controller controls a main switch to carry out a switching operation at a predetermined duty according to feedback voltage charged in a first capacitor in the normal operation mode, and controls the main switch to repeat a switching on state and a switching off state in the standby mode. The current inputted to the switching controller varies with the operation mode. Accordingly, the minimum voltage for operating the switching controller can be maintained even if output voltage is decreased in the standby mode, and unnecessary power consumption in the switching controller can be reduced.

24 Claims, 5 Drawing Sheets

Fixed switching time

SWITCHING MODE POWER SUPPLY FOR LOW POWER OPERATION

REFERENCE TO RELATED APPLICATIONS

This application claims priority of Korean Patent Application No. 2002-64188, filed 21 Oct. 2002, the disclosure of which is incorporated herein by reference.

FIELD OF THE INVENTION

The present invention relates to a switching mode power supply (SMPS) for low power operation and methods for making and using the same. More particularly, the present invention relates to an SMPS operating with low power in a standby mode, methods for making the same, and methods for using the same.

BACKGROUND OF THE INVENTION

Most electronic products (including a television set, a computer monitor, a VCR, etc.) operate in two modes: a normal operation mode where a large amount of power is consumed; and a standby mode where a small quantity of power is consumed while awaiting a normal operation signal. Though electronic products consume a smaller amount of power in the standby mode than in the normal operation mode, they are generally in the standby mode for a longer period of time. Consequently, efforts have recently focused on decreasing the amount of power lost while in the standby mode.

To that end, electronic products employ an auxiliary power supply or reduced output voltage in order to decrease the input power of the standby mode. A reduction in the output voltage, however, necessitates an increase in the number of components. There is a also a limit in the ability to decrease power consumption of the standby mode. Furthermore, an auxiliary power supply raises component costs.

A general SMPS consumes most of its input power when switching a control integrated circuit (IC) and a main switch of its primary side in the standby mode so that the power transferred to the secondary side is reduced, thereby deteriorating efficiency. To solve this problem, a burst mode SMPS operating in a burst mode in which the SMPS performs a switching operation in the standby mode for a predetermined period of time, and then stops the switching operation for a specific period of time, has been proposed. This reduces the number of switching times to increase efficiency.

FIG. 1 shows a conventional burst mode SMPS circuit. As illustrated in FIG. 1, the burst mode SMPS controls output voltages Vo1 and Vo2 according to a feedback circuit 10 that observes the output voltage of the secondary side of the circuit in the normal operation mode. The circuit also contains a switching controller 20 for controlling switching time according to the feedback information obtained by the feedback circuit 10. In the standby mode, the burst mode SMPS circuit operates in a burst mode in which the circuit observes and controls the output voltages according to the turn ratio of a transformer Tx that outputs current to Vcc.

In this conventional burst mode SMPS, however, current flows through a circuit that does not operate in the standby mode, thereby causing power to be unnecessarily consumed. To prevent this, the output voltage of the secondary side can be maintained at the minimum voltage for driving a microcomputer and reduce the output voltage to lower than the output voltage in the normal operation mode. In this case, however, the voltage applied to the switching controller 20 of the primary side cannot satisfy the minimum voltage for operating the switching controller 20.

SUMMARY OF THE INVENTION

The present invention related to a switching mode power supply in which the current flowing through a switching controller varies according to the operation mode of the SMPS. This configuration decreases the power loss generated in the switching controller during the standby mode and increases the range of output voltage drop, thereby reducing unnecessary power consumption.

In one aspect of the present invention, there is provided a switching mode power supply comprising a power supply unit including a main switch coupled to the primary coil of a transformer, the main switch performing a switching operation at a predetermined duty in a normal operation mode, the main switch carrying out no switching operation during a first period and performing the switching operation at a first duty for a second period in a standby mode to supply power to the secondary side of the transformer; a mode setting unit for controlling a mode setting voltage coupled to the output voltage of the secondary side of the transformer to operate the main switch in the normal operation mode or standby mode; a feedback circuit having a controlled current source whose current value varies with the mode setting voltage of the mode setting unit, and a first capacitor connected in parallel with the controlled current source; and a switching controller for controlling the main switch to carry out the switching operation at a predetermined duty according to feedback voltage charged in the first capacitor in the normal operation mode, the switching controller controlling the main switch to repeat a switching on state and switching off state in the standby mode, the quantity of current flowing through the switching controller in the normal operation mode being different from the quantity of current flowing through the switching controller in the standby mode.

In another aspect of the present invention, the switching controller comprises a switching driver for controlling the main switch to perform or stop the switching operation according to a switching control signal; and a switching control signal generator for generating the switching control signal to control the main switch to carry out the switching operation at a predetermined duty according to feedback voltage charged in the first capacitor in the normal operation mode, and to control the main switch to repeat the switching on state and switching off state in the standby mode.

In yet another aspect of the present invention, the switching control signal generator comprises a first diode whose anode is connected to the primary coil of the transformer; a second capacitor connected between the cathode of the first diode and the ground; a first resistor connected in parallel with the second capacitor; a third capacitor connected between the first resistor and the ground; and a first current source connected between the third capacitor and the ground, to make the quantity of current inputted to the switching driver in the normal operation mode different from the quantity of current flowing into the switching driver in the standby mode.

In still another aspect of the present invention, the switching controller comprises a switching driver for controlling the main switch to perform or stop the switching operation according to a switching control signal; a switching control signal generator for generating the switching control signal to control the main switch to carry out the switching operation at a predetermined duty according to feedback voltage charged in the first capacitor in the normal operation mode, and to control the main switch to repeat the switching on state and switching off state in the standby mode.

In still another aspect of the invention, the switching control signal generator comprises a first diode whose anode is connected to the primary coil of the transformer; a second capacitor connected between the cathode of the first diode and the ground; a first resistor connected in parallel with the second capacitor; a third capacitor connected between the first resistor and the ground; and a zener diode connected between the third capacitor and the ground, to make the quantity of current inputted to the switching driver in the normal operation mode different from the quantity of current flowing into the switching driver in the standby mode.

BRIEF DESCRIPTION OF THE DRAWINGS

The accompanying drawings, which are incorporated in and constitute a part of the specification, illustrate one aspect of the invention, and, together with the description, serve to explain the principles of the invention:

FIGS. 1–6 illustrate specific aspects of the invention and are a part of the specification. Together with the following description, the Figures demonstrate and explain the principles of the invention. The same reference numerals in different drawings represent the same element, and thus their descriptions will not be repeated.

DETAILED DESCRIPTION OF THE INVENTION

In the following detailed description, only the preferred aspect of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
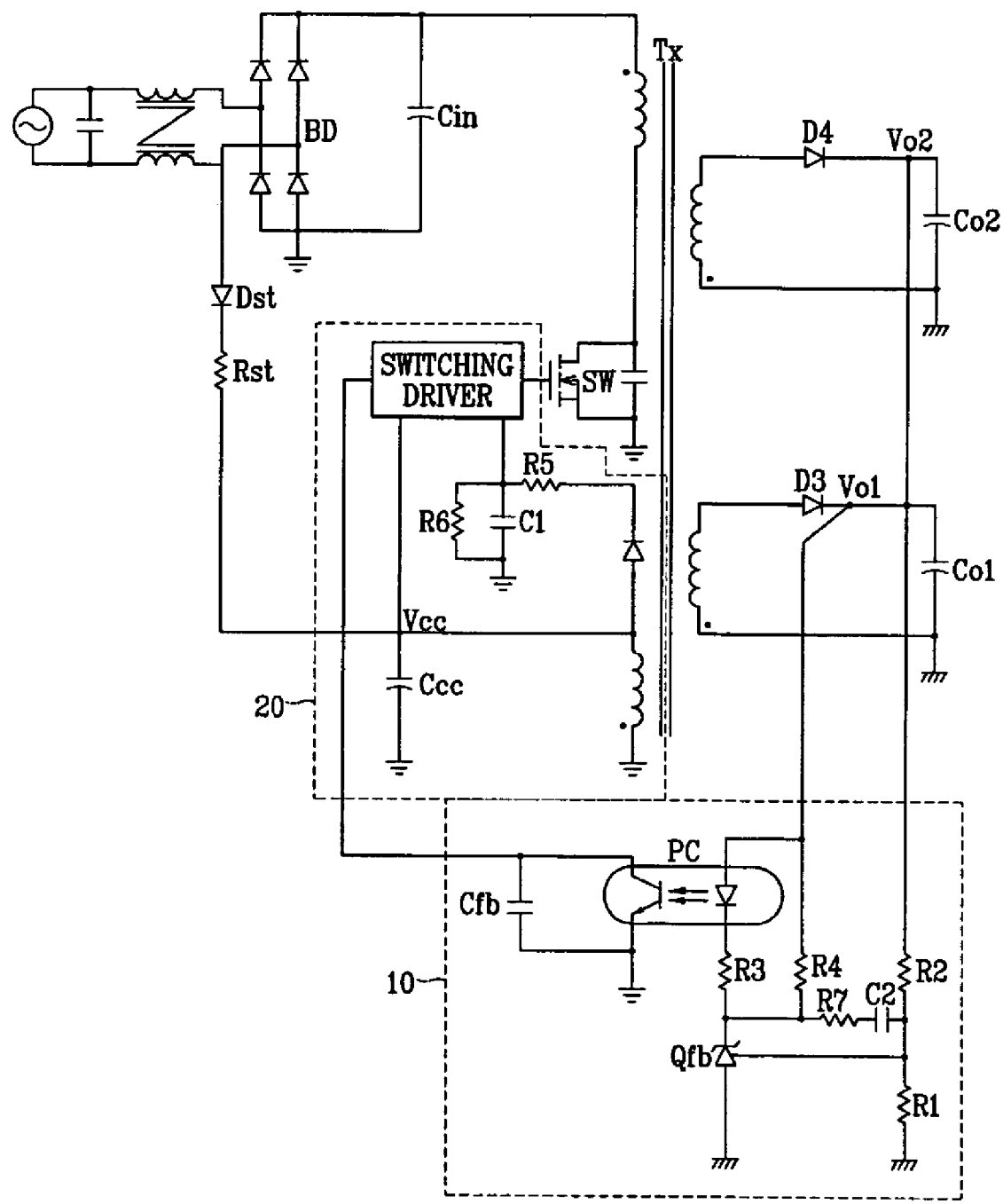
FIG. 1 shows a conventional SMPS circuit.
Figure 2:
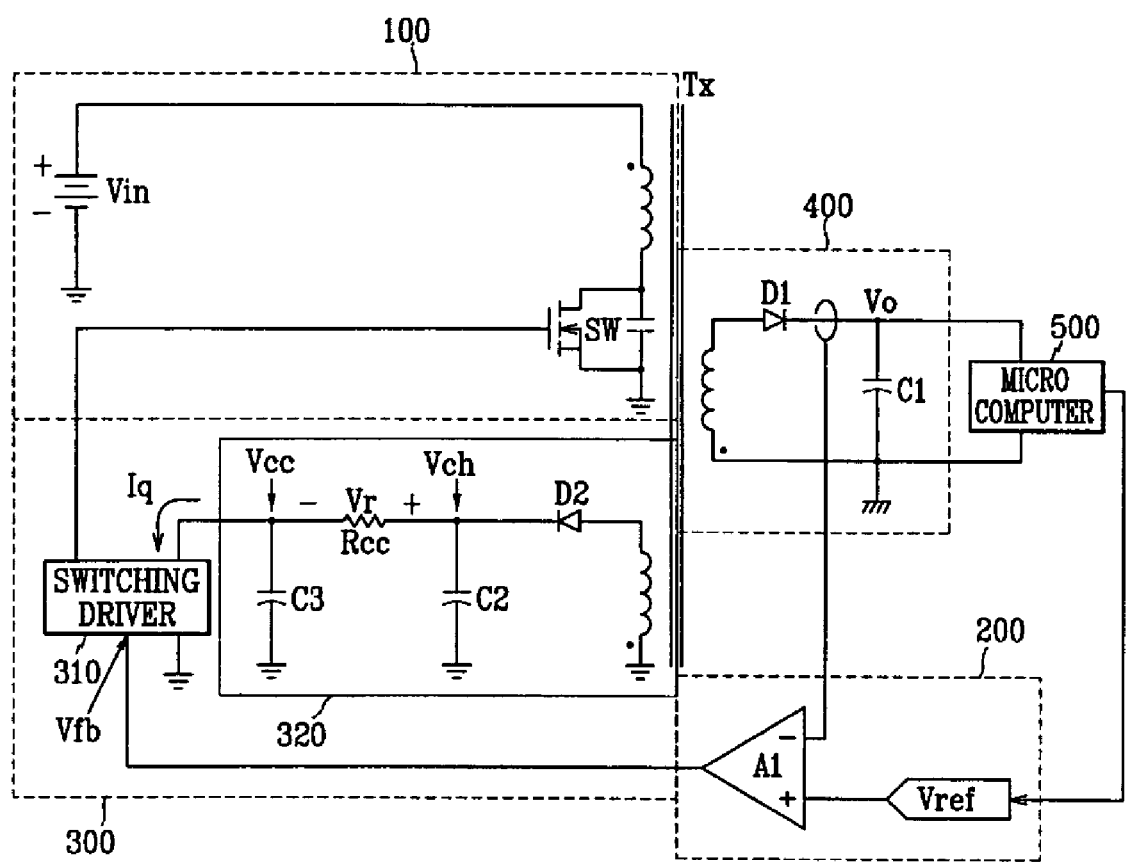
FIG. 2 shows an SMPS circuit according to an aspect of the present invention.

FIG. 2 roughly shows an SMPS circuit according to an aspect of the present invention. As depicted in FIG. 2, the SMPS circuit according to the present invention includes a power driver 100, a feedback circuit 200, a switching controller 300, and a mode setting unit 400.

The power driver 100 consists of the primary coil coupled to an input power Vin and a main switch SW connected to the primary coil. The power driver 100 accepts the input power Vin to provide an output voltage Vo to the secondary side of a transformer Tx that the mode setting unit 400 requires for the main switch SW. The power driver 100 also controls the duty of the main switch SW using a value obtained by feeding back the output voltage Vo to regulate the output voltage.

The mode setting unit 400 contains a diode D1 whose anode is coupled to the secondary side of the transformer Tx. The mode setting unit 400 also contains a capacitor C1 that is connected between the cathode of the diode D1 and the ground. The mode setting unit 400 operates the SMPS of the present invention in the normal operation mode or standby mode according to a control signal of a microcomputer 500.

The feedback circuit 200 compares the output voltage Vo of the mode setting unit 400 with a reference voltage Vref provided by the microcomputer 500. The feedback circuit outputs a feedback voltage Vfb corresponding to the comparison result to the switching controller 300.

The switching controller 300 includes a switching driver 310 for controlling the main switch SW to perform its switching operation or to stop it. The switching controller also contains a switching control signal generator 320 for generating a switching control signal for controlling the switching driver 310. The switching control signal generator 320 contains: a diode D2 whose anode is coupled to the primary coil; a capacitor C2 connected between the cathode of the diode D2 and the ground; a resistor Rcc connected to the capacitor C2; and a capacitor C3 coupled between the resistor Rcc and the ground. In the switching control signal generator, voltage Vcc and current Iq are used for operating the switching driver 310, and voltage Vch varies with a turn ratio of Vch and output voltage Vo. The Vcc is determined by the current Iq and the resistor Rcc.

The SMPS in one aspect of the present invention operated in the manner illustrated in FIG. 2. In the normal operation mode, the output voltage Vo must maintain a high voltage level. To accomplish this, the difference between the output voltage Vo and reference voltage Vref is continuously fed back through a comparator A1, and the duty of the main switch SW is controlled according to the feedback value. To reduce the number of switching times, the switching is carried out with a specific quantity of current only when the output voltage Vo becomes less than the reference voltage Vref. By doing so, the microcomputer 500 of the secondary side can stably maintain the normal operation mode state.

Where an electronic product employing the SMPS according to the present invention operates in the standby mode according to a user's operation, the output voltage Vo must have a low voltage level. To accomplish this, the reference voltage Vref applied to the comparator A1 is controlled.

However, the output voltage Vch of the coil of the switching driver 310 is determined by a turn ratio of the output voltage Vch and the output voltage Vo of the secondary side and the driving voltage of the switching driver 310, Vcc=Vch−Vr (Vr=Iq×Rcc). Thus, Vch and Vcc decrease when the output voltage Vo becomes lower, making it difficult to maintain the minimum voltage for operating the switching driver 310.

In one aspect of the present invention, accordingly, the output current Iq of the switching control signal generator 320 is set lower than that of the normal operation mode. As a result, Vr is reduced since Vcc=Vch−Vr and Vr=Iq×Rcc, and the range of drop of Vcc is also decreased. Therefore, it is possible to maintain the minimum voltage for operating the switching driver 310 even in a standby mode.

Figure 3:
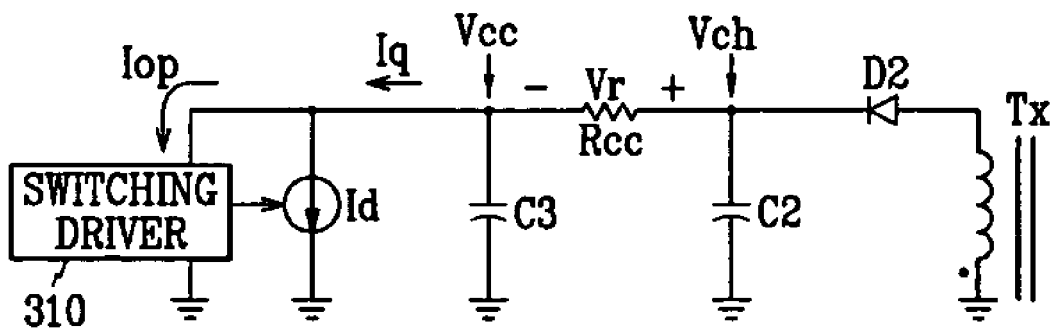
FIG. 3 shows an aspect of the switching controller of the SMPS circuit according to the present invention.

FIG. 3 shows a circuit for controlling the current of the switching controller 300 of the SMPS according to one aspect of the present invention. As shown in FIG. 3, a current source Id is inserted between one side of the switching driver 310 and the ground in order to control the operation current Iq of the switching driver 310 according to the operation mode of the SMPS. Specifically, when the operation state of the SMPS is in the normal operation mode, the switching driver 310 is controlled to flow current Id in addition to the minimum current Iop for driving the switching driver. Accordingly, the output current Iq of the switching control signal generator 320 becomes Iop+Id in the normal operation mode and Vr becomes higher.

When the SMPS operates in the standby mode, the switching driver 310 reduces the output current Iq of the switching control signal generator 320 such that the current Iq becomes identical to the minimum current Iop for operating the switching driver 310. In this manner, the current flowing into the switching driver 310 is reduced in the standby mode. The result is a decrease in Vr.

Figure 4:
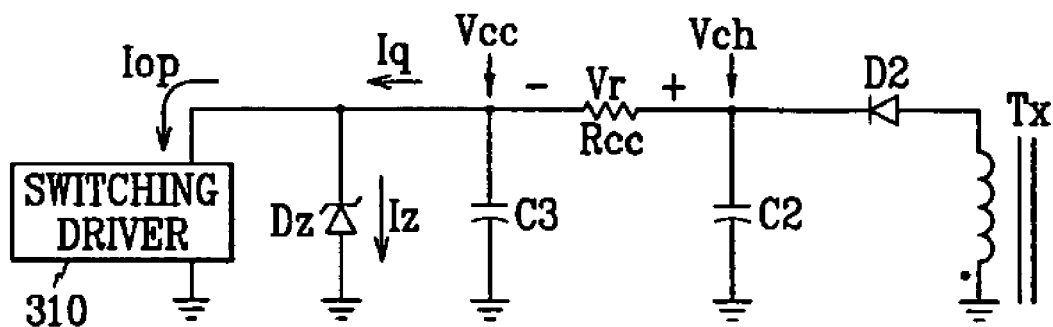
FIG. 4 shows another aspect of the switching controller of the SMPS circuit according to the present invention.

FIG. 4 shows another aspect of the present invention, a circuit for controlling the current of the switching controller. As shown in FIG. 4, a zener diode Dz is inserted between one side of the switching driver 310 and the ground in order to control the operation current Iq of the switching driver 310 according to the operation mode of the SMPS. When the SMPS operates in the normal operation mode, the zener diode Dz is also normally operated so that Vcc becomes equal to Vz (operation voltage of the zener diode) and the output current Iq of the switching control signal generator 320 becomes Iop+Id. When the operation of the SMPS is converted into the standby mode, the output voltage decreases so that the zener diode Dz does not operate. As a result, the current Iq applied to the switching driver 310 is reduced to Iop and Vr is also decreased.

In this aspect of the invention, the switching driver 310 reduces the output current Iq of the switching control signal generator 320 such that the output current Iq becomes identical to the minimum current Iop for operating the switching driver 310. In other words, the current flowing into the switching driver 310 decreases in the standby mode so that Vr becomes lower.

Figure 5:
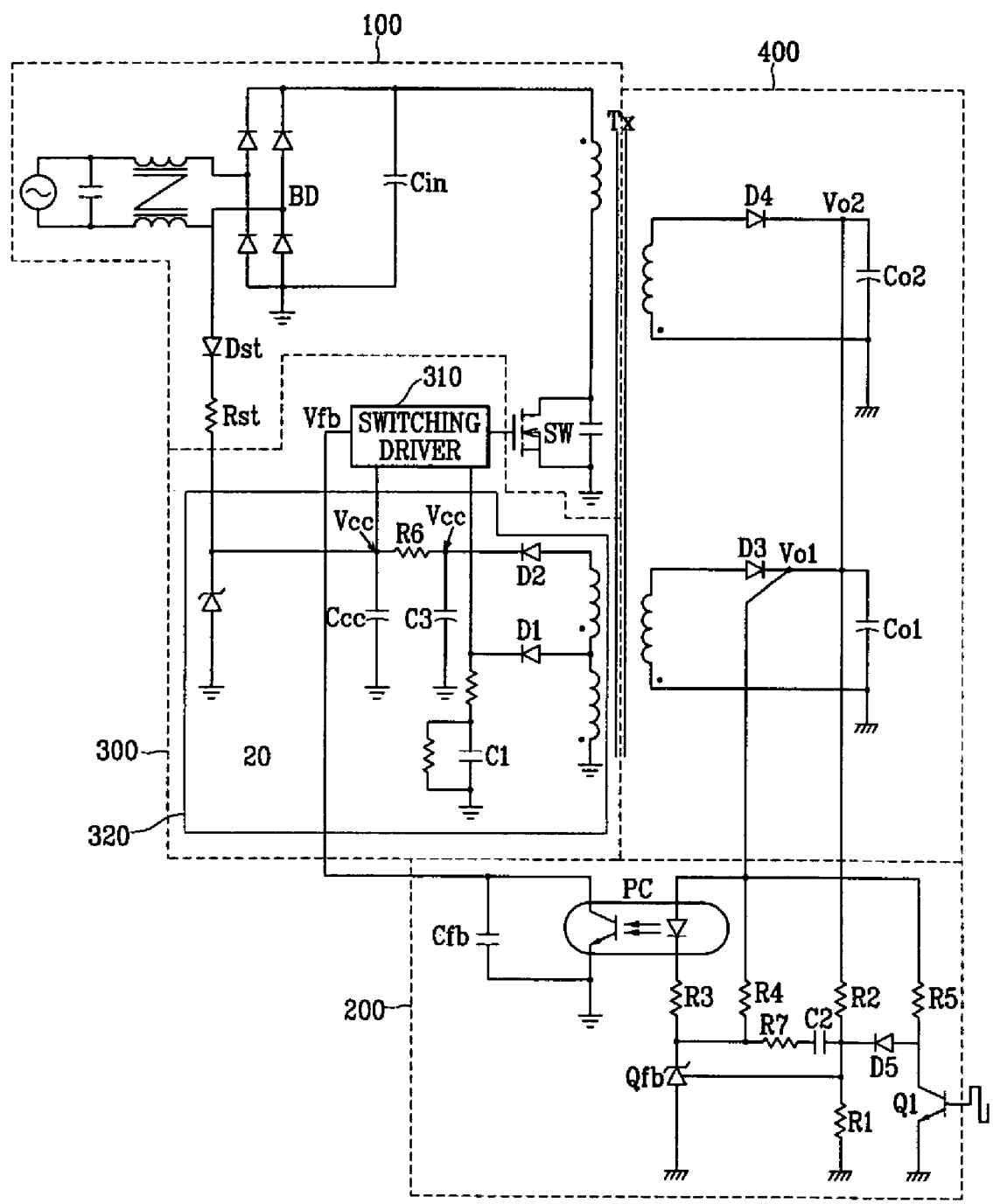
FIG. 5 is a detailed circuit diagram of the SMPS according to one aspect fo the present invention.

FIG. 5 is a detailed circuit diagram of the SMPS according to another aspect of the present invention. As shown in FIG. 5, the power driver 100 includes a bridge diode BD for rectifying AC voltage applied thereto and a capacitor Cin for smoothing the rectified voltage, in addition to the primary coil coupled to the input power Vin and the main switch SW connected to the primary coil. The power driver employs a MOSFET as the main switch SW.

The mode setting unit 400 includes diodes D3 and D4 whose anodes are connected to the secondary coil of the transformer, and capacitors Co1 and Co2 respectively connected between the cathodes of the diodes D3 and D4 and the ground. In addition, the mode setting unit 400 further includes a photodiode (PD) for comparing contact voltage Vo1 of the diode D3 and capacitor Co1 with contact voltage Vo2 of the diode D4 and capacitor Co2. The mode setting unit 400 also contains a shunt resistor 410.

The feedback circuit 200 contains a photo-transistor PT constructing the photodiode PD of the mode setting unit 400, a photo-coupler PC, and a capacitor Cfb connected in parallel with the photo-transistor PT. The photo-transistor PT flows current corresponding to a difference between Vo1 and Vo2.

The switching controller 300 includes the switching driver 310 for controlling the main switch SW to perform its switching operation or to stop it. The switching controller also contains a switching control signal generator 320 for generating a switching control signal for controlling the switching driver 310. In this aspect of the invention, the switching driver 310 receives feedback voltage Vfb charged in the capacitor Cfb and voltage Vcc charged in a capacitor Ccc according to a winding voltage of the primary coil through its input pins. The switching driver 310 outputs a voltage to the switching MOSFET SW for controlling its switching operation.

In one aspect of the present invention, the SMPS is operated as described below (and with reference to FIG. 5). In the normal operation mode, the microcomputer applies a high voltage to the base of a transistor Q1 to turn on the transistor Q1. In this case, a diode D5 is turned off because it is provided with a reverse-biased voltage. Accordingly, the output voltage Vo2 is controlled to be Vo2=Vref(1+R2/R1). In this aspect of the invention, Vref is the internal reference voltage of the shunt resistor 410. The voltage Vo2 is applied to the shunt resistor 410 to be amplified to a voltage with a predetermined level. The output voltage of the shunt resistor 410 is inputted to the photodiode PD so that a predetermined quantity of current corresponding to the output value of the shunt resistor 410 flows through the photo-transistor PT. The voltages Vo1 and Vch have values based on their turn ratios. And since the zener diode Dz is inserted between one side of the switching driver 310 and the ground is normally operated, Vcc becomes equal to Vz (operation voltage of the zener diode), and a specific quantity of current flows through the zener diode Dz.

Where the electronic product operates in the standby mode according to its user's operation, the microcomputer 500 applies a low voltage to the base of the transistor Q1 to turn off the transistor Q1. In this case, the diode D5 is provided with a forward bias voltage to be turned on. Accordingly, current flows through resistors R5 and R1 simultaneously. When resistance values of R5 and R2 are set in a manner that R5<<R2, the minimum voltage of Vo1 is controlled to be Vo1=Vref(1+R5/R1). In addition, the output voltage decreases so that the zener diode does not operate. Thus, only the minimum amount of current for operating the switching driver 310 is inputted to the switching driver 310, thereby reducing the range of drop of Vcc.

Figure 6:
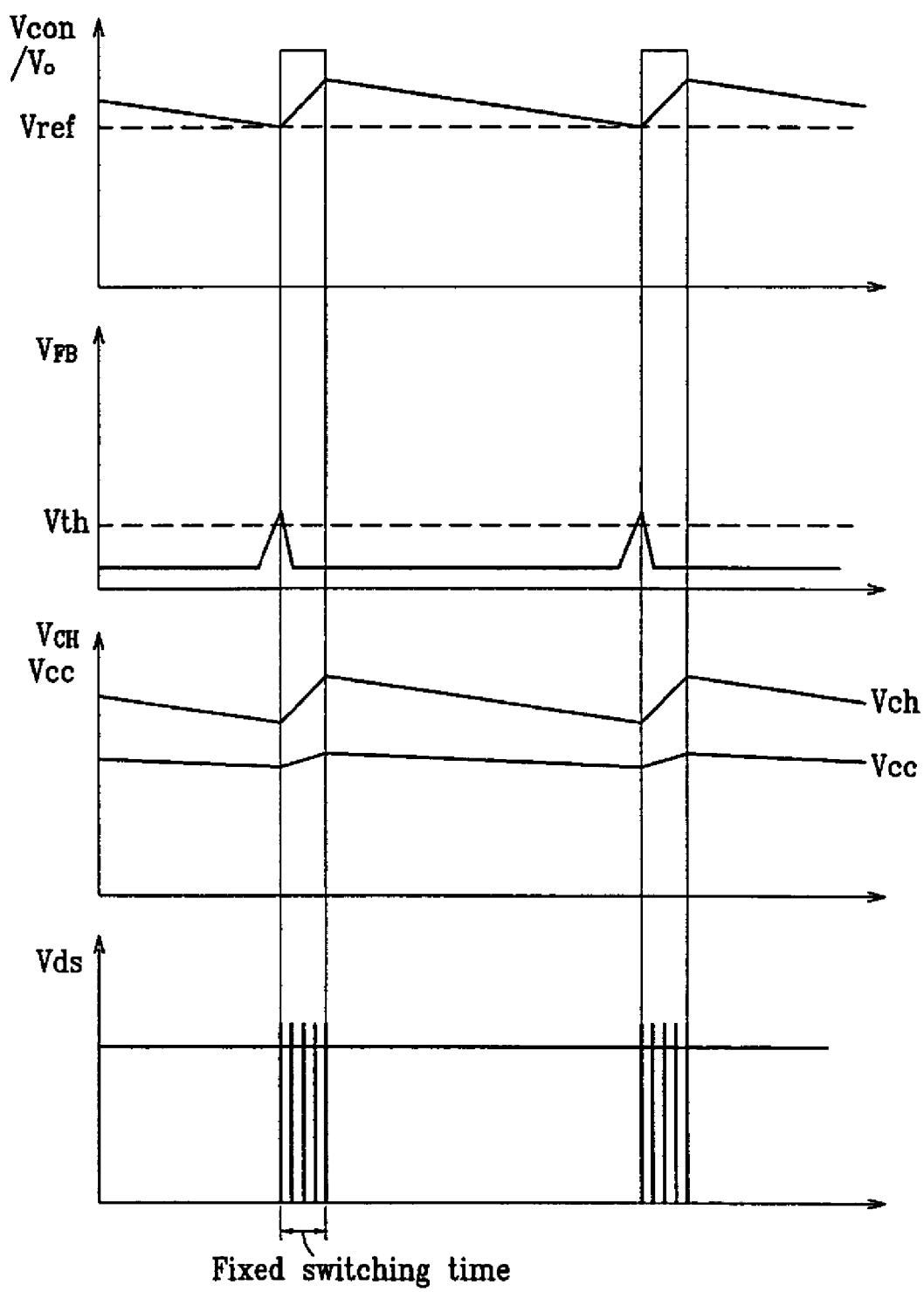
FIG. 6 shows waveforms of signals in the standby mode of the SMPS circuit according to the present invention.

FIG. 6 shows waveforms of signals in the standby mode of the SMPS according to the present invention. As shown in FIG. 6, a specific quantity of current is continuously consumed by the load connected to the secondary side during a period for which the switching operation is not carried out, while the output voltage maintains a specific level. Thus, the output voltage is gradually decreased, which is transferred to the controller of the primary side through the photo-coupler PC. When the output voltage is reduced to turn off the photo-coupler, the capacitor Cfb connected to the switching driver 310 is gradually charged according to the current source placed inside the switching driver 310. When the Vfb becomes higher than a reference voltage Vth, the switching driver 310 drives the switching MOSFET to perform its switching operation.

Upon beginning the switching operation, the output voltage Vo increases to higher than the minimum voltage. When the feedback voltage Vfb is applied to the switching driver 310 through the feedback circuit 200, the switching driver 310 carries out its switching operation for a period of time set in its designing step and transfers a specific amount of power to the secondary side. Accordingly, the output voltage Vo increases again during the switching period, and when the switching period is finished, it is gradually decreased. The switching operation is not performed until the output voltage Vo reaches the reference voltage Vref.

The detailed circuit of the SMPS according to the aspect of the present invention shown in FIG. 3 can be easily analogized from FIG. 5. So an explanation of the circuit for FIG. 3 is omitted.

While this invention has been described in connection with what is presently considered to be the most practical and preferred aspect, it is to be understood that the invention is not limited to the disclosed aspects, but, on the contrary, is intended to cover various modifications and equivalent arrangements included within the spirit and scope of the appended claims.

As described above, according to the SMPS of the present invention, the current inputted to the switching controller varies according to the operation mode so that the minimum voltage for operating the switching controller can be maintained even if the output voltage is decreased in the standby mode. In addition, unnecessary power consumption in the switching controller can be reduced. Further, the switching operation is carried out only for a predetermined period of time in the standby mode, and the output voltage is gradually decreased during the period when the switching operation is not performed. This reduces unnecessary power consumption due to the switching operation in the standby mode.

What is claimed is:

1. A switching mode power supply comprising:
   a power supply unit including a main switch coupled to the primary coil of a transformer, the main switch performing a switching operation at a predetermined duty in a normal operation mode, the main switch carrying out no switching operation during a first period and performing the switching operation at a first duty for a second period in a standby mode to supply power to the secondary side of the transformer;
   a mode setting unit for controlling a mode setting voltage coupled to the output voltage of the secondary side of the transformer to operate the main switch in the normal operation mode or standby mode;
   a feedback circuit having a controlled current source whose current value varies with the mode setting voltage of the mode setting unit, and a first capacitor connected in parallel with the controlled current source; and
   a switching controller for controlling the main switch to carry out the switching operation in the standby mode according to a feedback voltage from the feedback circuit, the quantity of current flowing through the switching controller in the normal operation mode being different from the quantity of current flowing through the switching controller in the standby mode, wherein the switching controller comprises:
   a switching driver for controlling the main switch to perform or stop the switching operation according to a switching control signal; and
   a switching control signal generator for generating the switching control signal to control the main switch to carry out the switching operation at a predetermined duty according to feedback voltage charged in the first capacitor in the normal operation mode, and to control the main switch to repeat the switching on state and switching off state in the standby mode,
   the switching control signal generator comprising:
   a first diode whose anode is connected to the primary coil of the transformer;
   a second capacitor connected between the cathode of the first diode and the ground;
   a first resistor connected in parallel with the second capacitor;
   a third capacitor connected between the first resistor and the ground; and
   a first current source connected between the third capacitor and the ground, to make the quantity of current inputted to the switching driver in the normal operation mode different from the quantity of current flowing into the switching driver in the standby mode.

2. The switching mode power supply as claimed in claim 1, wherein the switching driver detects the normal operation mode so as to control a predetermined quantity of current to flow through the first current source.

3. A switching mode power supply comprising:
   a power supply unit including a main switch coupled to the primary coil of a transformer, the main switch performing a switching operation at a predetermined duty in a normal operation mode, the main switch carrying out no switching operation during a first period and performing the switching operation at a first duty for a second period in a standby mode to supply power to the secondary side of the transformer;
   a mode setting unit for controlling a mode setting voltage coupled to the output voltage of the secondary side of the transformer to operate the main switch in the normal operation mode or standby mode;
   a feedback circuit having a controlled current source whose current value varies with the mode setting voltage of the mode setting unit, and a first capacitor connected in parallel with the controlled current source; and
   a switching controller for controlling the main switch to carry out the switching operation in the standby mode according to a feedback voltage from the feedback circuit, the quantity of current flowing through the switching controller in the normal operation mode being different from the quantity of current flowing through the switching controller in the standby mode, wherein the switching controller comprises:
   a switching driver for controlling the main switch to perform or stop the switching operation according to a switching control signal;
   a switching control signal generator for generating the switching control signal to control the main switch to carry out the switching operation at a predetermined duty according to feedback voltage charged in the first capacitor in the normal operation mode, and to control the main switch to repeat the switching on state and switching off state in the standby mode,
   the switching control signal generator comprising:
   a first diode whose anode is connected to the primary coil of the transformer;
   a second capacitor connected between the cathode of the first diode and the ground;
   a first resistor connected in parallel with the second capacitor;
   a third capacitor connected between the first resistor and the ground; and
   a zener diode connected between the third capacitor and the ground, to make the quantity of current inputted to the switching driver in the normal operation mode different from the quantity of current flowing into the switching driver in the standby mode.

4. The switching mode power supply as claimed in claim 2, wherein the zener diode is turned on in the normal operation mode such that a predetermined quantity of current flows through the zener diode.

5. A method of operating a power supply unit, comprising:
   providing a power supply unit including a main switch coupled to the primary coil of a transformer, the main switch performing a switching operation at a predetermined duty in a normal operation mode, the main switch carrying out no switching operation during a first period and performing the switching operation at a first duty for a second period in a standby mode to supply power to the secondary side of the transformer;

providing a mode setting unit for controlling a mode setting voltage coupled to the output voltage of the secondary side of the transformer to operate the main switch in the normal operation mode or standby mode;

providing a feedback circuit having a controlled current source whose current value varies with the mode setting voltage of the mode setting unit, and a first capacitor connected in parallel with the controlled current source; and providing a switching controller for controlling the main switch to carry out the switching operation in the standby mode according to a feedback voltage from the feedback circuit, the quantity of current flowing through the switching controller in the normal operation mode being different from the quantity of current flowing through the switching controller in the standby mode, wherein the switching controller comprises:

a switching driver for controlling the main switch to perform or stop the switching operation according to a switching control signal; and a switching control signal generator for generating the switching control signal to control the main switch to carry out the switching operation at a predetermined duty according to feedback voltage charged in the first capacitor in the normal operation mode, and to control the main switch to repeat the switching on state and switching off state in the standby mode, the switching control signal generator comprising:

a first diode whose anode is connected to the primary coil of the transformer;

a second capacitor connected between the cathode of the first diode and the ground;

a first resistor connected in parallel with the second capacitor;

a third capacitor connected between the first resistor and the ground; and a first current source connected between the third capacitor and the ground, to make the quantity of current inputted to the switching driver in the normal operation mode different from the quantity of current flowing into the switching driver in the standby mode.

6. The method of claim 5, further comprising:

providing the switching driver that detects the normal operation mode so as to control a predetermined quantity of current to flow through the first current source.

7. The method of claim 6, further comprising turning on the zener diode in the normal operation mode such that a predetermined quantity of current flows through the zener diode.

8. A method for making a switching mode power supply, comprising:

providing a power supply unit including a main switch coupled to the primary coil of a transformer, the main switch performing a switching operation at a predetermined duty in a normal operation mode, the main switch carrying out no switching operation during a first period and performing the switching operation at a first duty for a second period in a standby mode to supply power to the secondary side of the transformer;

providing a mode setting unit for controlling a mode setting voltage coupled to the output voltage of the secondary side of the transformer to operate the main switch in the normal operation mode or standby mode;

providing a feedback circuit having a controlled current source whose current value varies with the mode setting voltage of the mode setting unit, and a first capacitor connected in parallel with the controlled current source; and providing a switching controller for controlling the main switch to carry out the switching operation in the standby mode according to a feedback voltage from the feedback circuit, the quantity of current flowing through the switching controller in the normal operation mode being different from the quantity of current flowing through the switching controller in the standby mode, wherein the switching controller comprises:

a switching driver for controlling the main switch to perform or stop the switching operation according to a switching control signal;

a switching control signal generator for generating the switching control signal to control the main switch to carry out the switching operation at a predetermined duty according to feedback voltage charged in the first capacitor in the normal operation mode, and to control the main switch to repeat the switching on state and switching off state in the standby mode, the switching control signal generator comprising:

a first diode whose anode is connected to the primary coil of the transformer;

a second capacitor connected between the cathode of the first diode and the ground;

a first resistor connected in parallel with the second capacitor;

a third capacitor connected between the first resistor and the ground; and a zener diode connected between the third capacitor and the ground, to make the quantity of current inputted to the switching driver in the normal operation mode different from the quantity of current flowing into the switching driver in the standby mode.

9. A system containing a switching mode power supply, the switching mode power supply, comprising:

a power supply unit including a main switch coupled to the primary coil of a transformer, the main switch performing a switching operation at a predetermined duty in a normal operation mode, the main switch carrying out no switching operation during a first period and performing the switching operation at a first duty for a second period in a standby mode to supply power to the secondary side of the transformer;

a mode setting unit for controlling a mode setting voltage coupled to the output voltage of the secondary side of the transformer to operate the main switch in the normal operation mode or standby mode;

a feedback circuit having a controlled current source whose current value varies with the mode setting voltage of the mode setting unit, and a first capacitor connected in parallel with the controlled current source; and a switching controller for controlling the main switch to carry out the switching operation in the standby mode according to a feedback voltage from the feedback circuit, the quantity of current flowing through the switching controller in the normal operation mode being different from the Quantity of current flowing through the switching controller in the standby mode, wherein the switching controller comprises:

a switching driver for controlling the main switch to perform or stop the switching operation according to a switching control signal; and a switching control signal generator for generating the switching control signal to control the main switch to carry out the switching operation at a predetermined duty according to feedback voltage charged in the first capacitor in the normal operation mode, and to control the main switch to repeat the switching on state and switching off state in the standby mode, the switching control signal generator comprising:

a first diode whose anode is connected to the primary coil of the transformer;

a second capacitor connected between the cathode of the first diode and the ground;

a first resistor connected in parallel with the second capacitor;

a third capacitor connected between the first resistor and the ground; and a first current source connected between the third capacitor and the ground, to make the quantity of current inputted to the switching driver in the normal operation mode different from the quantity of current flowing into the switching driver in the standby mode.

10. The system of claim 9, wherein the switching driver detects the normal operation mode so as to control a predetermined quantity of current to flow through the first current source.

11. An electronic apparatus containing a switching mode power supply, the switching mode power supply, comprising:

a power supply unit including a main switch coupled to the primary coil of a transformer, the main switch performing a switching operation at a predetermined duty in a normal operation mode, the main switch carrying out no switching operation during a first period and performing the switching operation at a first duty for a second period in a standby mode to supply power to the secondary side of the transformer;

a mode setting unit for controlling a mode setting voltage coupled to the output voltage of the secondary side of the transformer to operate the main switch in the normal operation mode or standby mode;

a feedback circuit having a controlled current source whose current value varies with the mode setting voltage of the mode setting unit, and a first capacitor connected in parallel with the controlled current source; and a switching controller for controlling the main switch to carry out the switching operation in the standby mode according to a feedback voltage from the feedback circuit, the quantity of current flowing through the switching controller in the normal operation mode being different from the quantity of current flowing through the switching controller in the standby mode, wherein the switching controller comprises:

a switching driver for controlling the main switch to perform or stop the switching operation according to a switching control signal;

a switching control signal generator for generating the switching control signal to control the main switch to carry out the switching operation at a predetermined duty according to feedback voltage charged in the first capacitor in the normal operation mode, and to control the main switch to repeat the switching on state and switching off state in the standby mode, the switching control signal generator comprising:

a first diode whose anode is connected to the primary coil of the transformer;

a second capacitor connected between the cathode of the first diode and the ground;

a first resistor connected in parallel with the second capacitor;

a third capacitor connected between the first resistor and the ground; and a zener diode connected between the third capacitor and the ground, to make the quantity of current inputted to the switching driver in the normal operation mode different from the quantity of current flowing into the switching driver in the standby mode.

12. The apparatus of claim 11, wherein the zener diode is turned on in the normal operation mode such that a predetermined quantity of current flows through the zener diode.

13. The power supply of claim 1, wherein the switching driver operates continually during the standby mode.

14. The method of claim 8, wherein the switching driver operates continually during the standby mode.

15. The system of claim 9, wherein the switching driver operates continually during the standby mode.

16. The apparatus of claim 11, wherein the switching driver operates continually during the standby mode.

17. The power supply of claim 1, wherein the voltage from the feedback circuit is always more than zero during the standby mode.

18. The method of claim 8, wherein the voltage from the feedback circuit is always more than zero during the standby mode.

19. The system of claim 9, wherein the voltage from the feedback circuit is always more than zero during the standby mode.

20. The apparatus of claim 11, wherein the voltage from the feedback circuit is always more than zero during the standby mode.

21. The power supply of claim 3, wherein the switching driver operates continually during the standby mode.

22. The method of claim 5, wherein the switching driver operates continually during the standby mode.

23. The power supply of claim 3, wherein the voltage from the feedback circuit is always more than zero during the standby mode.

24. The system of claim 5, wherein the voltage from the feedback circuit is always more than zero during the standby mode.

* * * * *